US00RE48883E

(19) United States
(12) Reissued Patent
Roosen et al.

(10) Patent Number: US RE48,883 E
(45) Date of Reissued Patent: Jan. 11, 2022

(54) LUGGAGE SHELL WITH SURFACE CONFIGURATION

(71) Applicant: HS New Travel GmbH, Berlin (DE)

(72) Inventors: Jan Roosen, Berlin (DE); Max Koriath, Berlin (DE)

(73) Assignee: HS New Travel GmbH, Berlin (DE)

(21) Appl. No.: 29/776,898

(22) Filed: Apr. 1, 2021

Related U.S. Patent Documents

Reissue of:
(64) Patent No.: Des. 889,837
Issued: Jul. 14, 2020
Appl. No.: 29/664,241
Filed: Sep. 24, 2018

(30) Foreign Application Priority Data

Mar. 22, 2018 (EP) ..... 004952505-0011
Mar. 22, 2018 (EP) ..... 004952505-0012

(51) LOC (13) Cl. ..... 03-01
(52) U.S. Cl.
USPC ..... D3/318
(58) Field of Classification Search
USPC ..... D3/318, 273, 279, 285, 289
CPC ..... A45C 2005/032; A45C 2005/035; A45C 5/03; A45C 3/02; A45C 5/14; A45C 13/36; A45C 5/00
See application file for complete search history.

(56) References Cited

U.S. PATENT DOCUMENTS

| | | | | |
|---|---|---|---|---|
| D587,902 | S * | 3/2009 | Yoneno | D3/279 |
| D613,054 | S * | 4/2010 | Morszeck | D3/205 |
| D679,495 | S * | 4/2013 | Dolce | D3/243 |
| D711,104 | S * | 8/2014 | Lai | D3/279 |
| D711,646 | S * | 8/2014 | Ke | D3/279 |
| D711,649 | S * | 8/2014 | Chen | D3/279 |
| D720,928 | S * | 1/2015 | Roncato | D3/279 |

(Continued)

*Primary Examiner* — Philip S Hyder
(74) *Attorney, Agent, or Firm* — Dickinson Wright PLLC

(57) CLAIM

The ornamental design for a luggage shell with surface configuration, as shown and described.

DESCRIPTION

This application *is an application for reissue of U.S. Design Pat. No. D. 889,837, which issued on Jul. 14, 2020, from U.S. Design application Ser. No. 29/664,241, which was filed on September 24, 2018, and* claims the benefit of EUIPO Community Design No. 004952505-0011, filed Mar. 22, 2018, and EUIPO Community Design No. 004952505-0012, filed Mar. 22, 2018. The disclosure of the above applications is incorporated herein by reference.

FIG. 1 is a perspective view of the luggage shell with surface configuration in a first environment showing a representative luggage shell in broken lines;
FIG. 2 is a front view thereof;
FIG. 3 is a rear view thereof;
FIG. 4 is a right side view thereof;
FIG. 5 is a left side view thereof;
FIG. 6 is a perspective view of the luggage shell with surface configuration in a second environment showing a representative piece of luggage in broken lines;
FIG. 7 is a front view thereof;
FIG. 8 is a rear view thereof;
FIG. 9 is a right side view thereof; and,
FIG. 10 is a left side view thereof.

The broken lines showing luggage are for the purposes of illustrating environment and forms no part of the claimed design.

1 Claim, 10 Drawing Sheets

Figure 1:
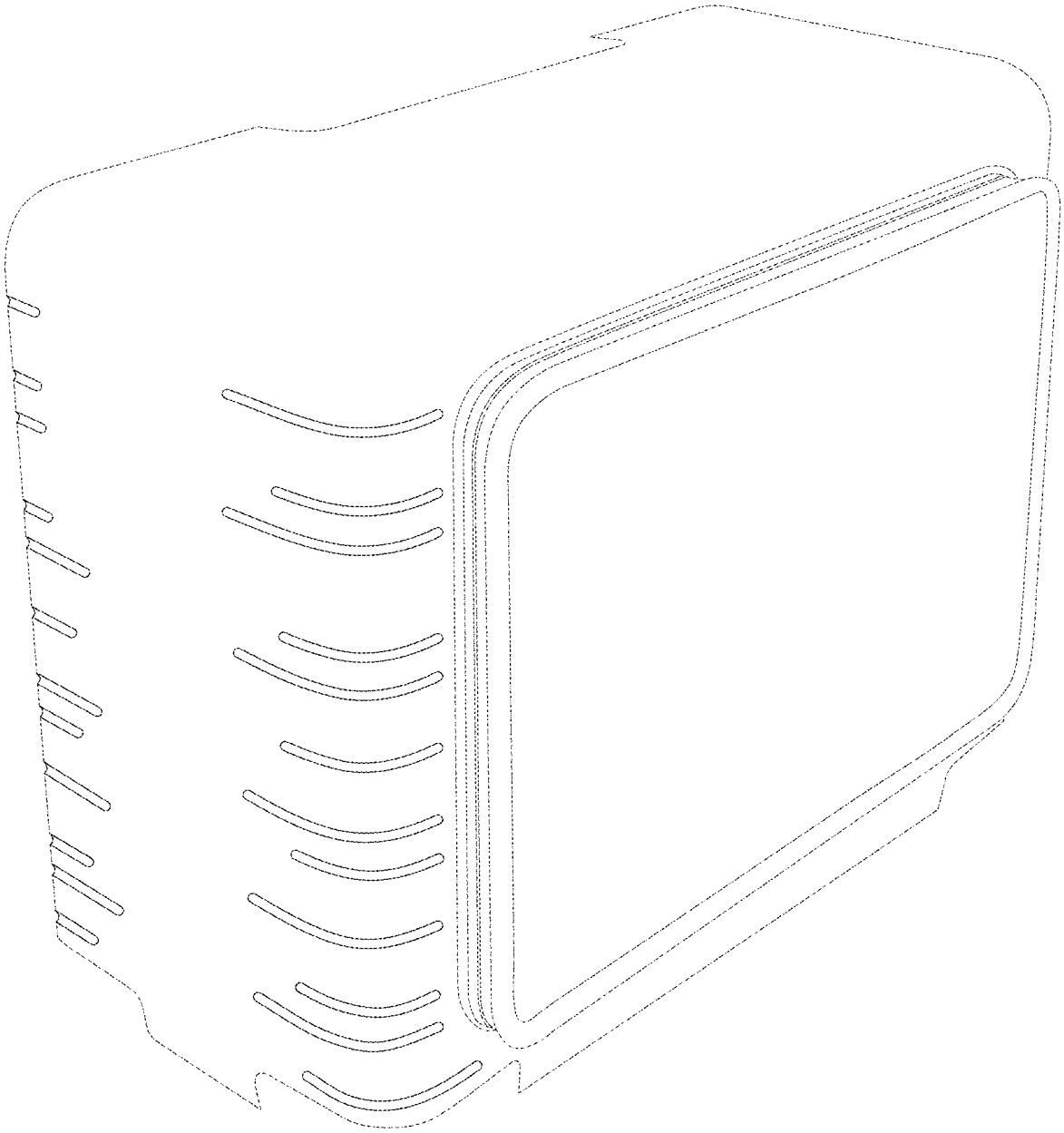

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D722,771 | S | * | 2/2015 | Wu | D3/279 |
| D732,823 | S | * | 6/2015 | Baron | D3/276 |
| D740,558 | S | * | 10/2015 | Liao | D3/279 |
| D755,518 | S | * | 5/2016 | Sijmons | D3/279 |
| D767,270 | S | * | 9/2016 | Maier | D3/243 |
| D768,985 | S | * | 10/2016 | Morszeck | D3/279 |
| D793,727 | S | * | 8/2017 | Brundl | D3/279 |
| D798,046 | S | * | 9/2017 | Michele | D3/232 |
| D801,047 | S | * | 10/2017 | Bhatnagar | D3/279 |
| D803,554 | S | * | 11/2017 | Maier | D3/243 |
| D803,555 | S | * | 11/2017 | Maier | D3/243 |
| D816,335 | S | * | 5/2018 | Chen | D3/273 |
| D816,336 | S | * | 5/2018 | Morszeck | D3/279 |
| D817,638 | S | * | 5/2018 | Salander | D3/279 |
| D818,706 | S | * | 5/2018 | Maier | D3/232 |
| D836,909 | S | * | 1/2019 | Karl | D3/279 |
| D852,498 | S | * | 7/2019 | Sassi | D3/243 |
| D871,073 | S | * | 12/2019 | Schaepers | D3/318 |
| D874,139 | S | * | 2/2020 | Rubio | D3/279 |
| 2011/0186396 | A1 | * | 8/2011 | Sheikh | A45C 13/10 190/111 |
| 2016/0051022 | A1 | * | 2/2016 | Morszeck | A45C 5/02 190/18 A |
| 2017/0290401 | A1 | * | 10/2017 | Bhatnagar | A45C 5/14 |

* cited by examiner

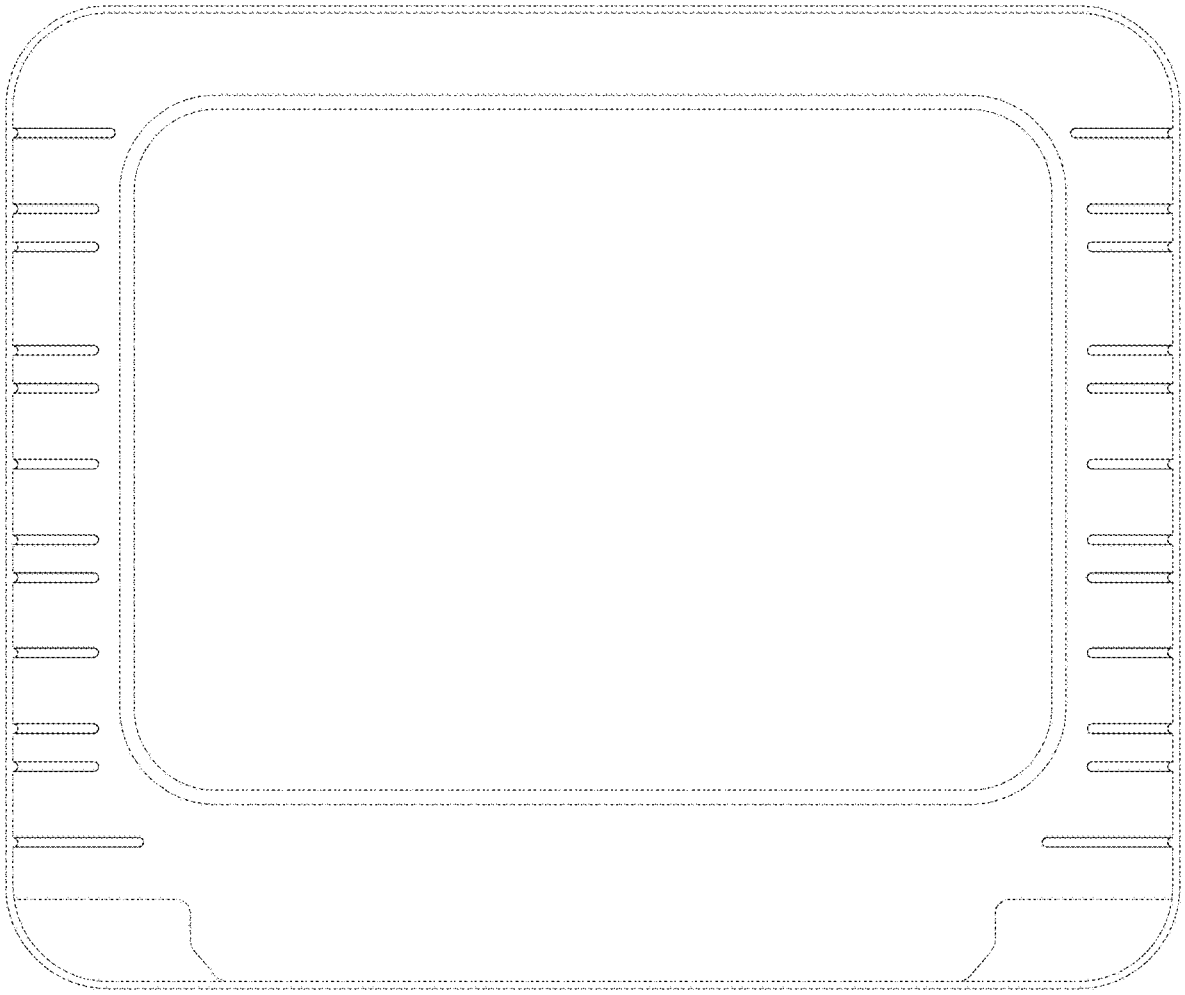
Fig. 2
(Amended)

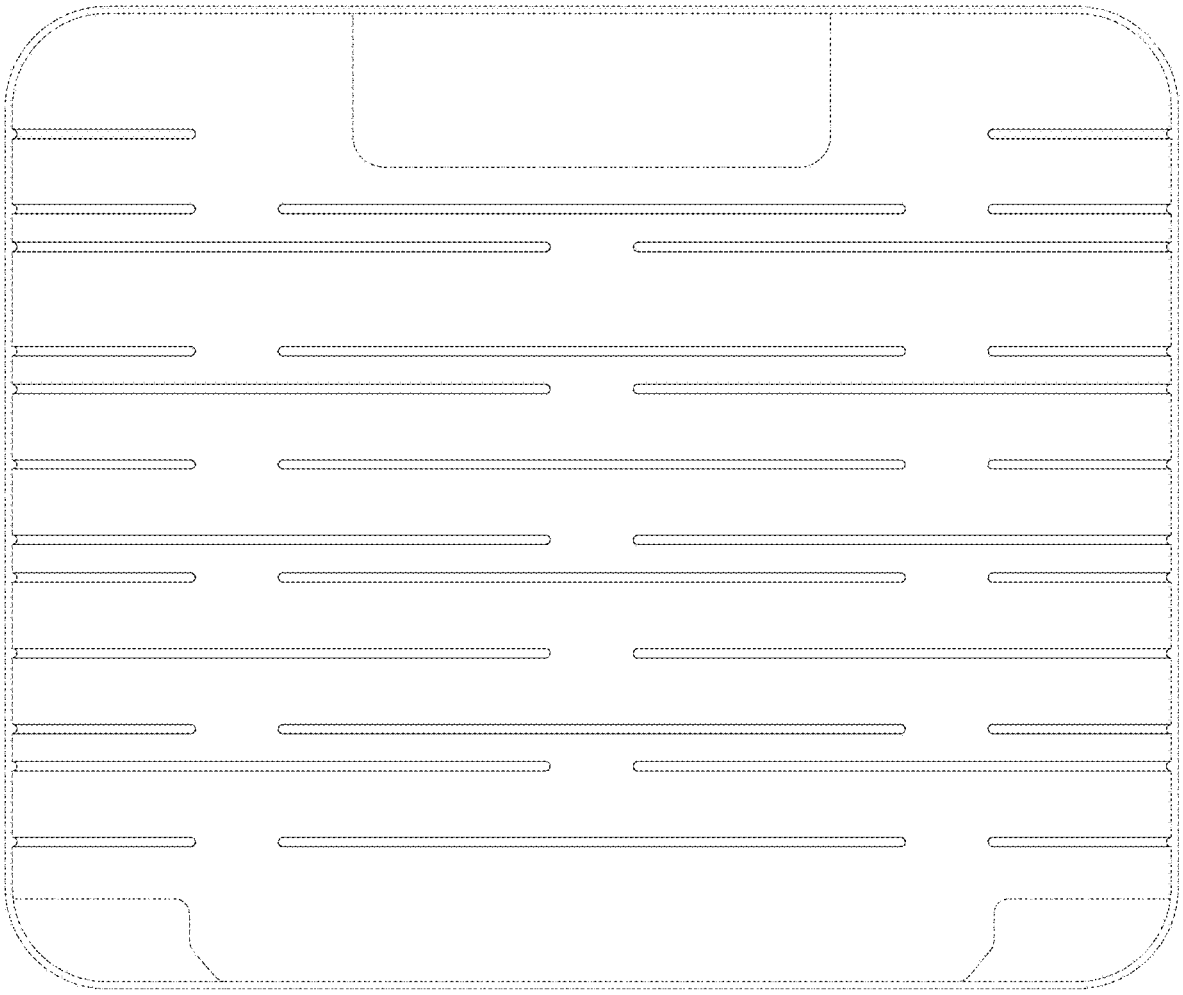
Fig. 3
(Amended)

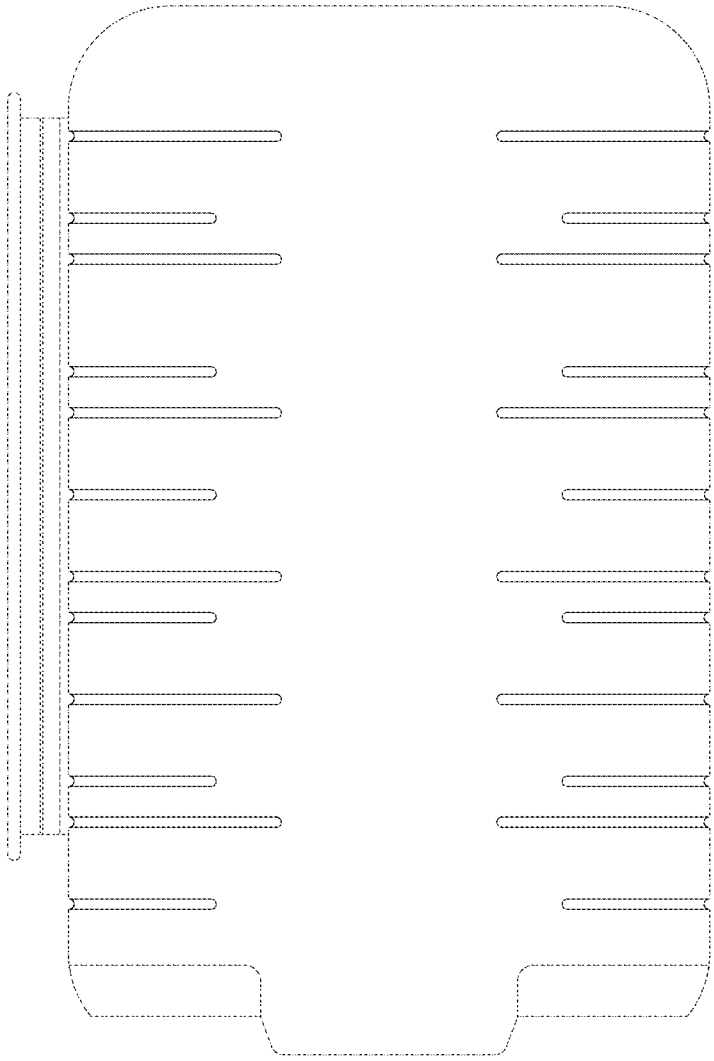
Fig. 4
(Amended)

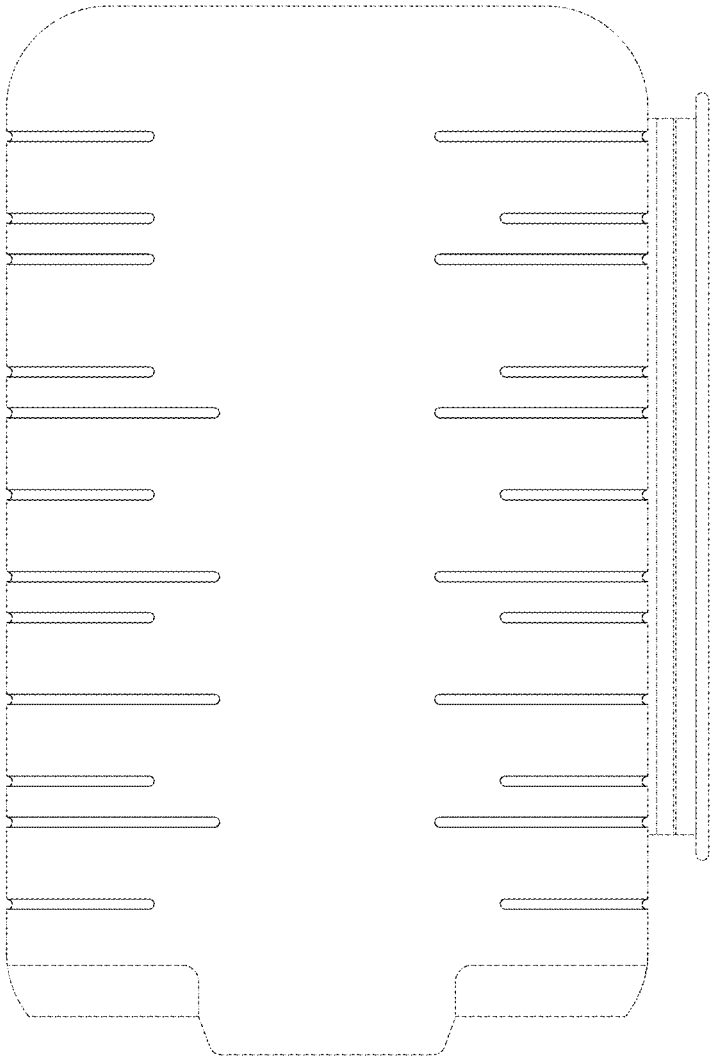
Fig. 5
(Amended)

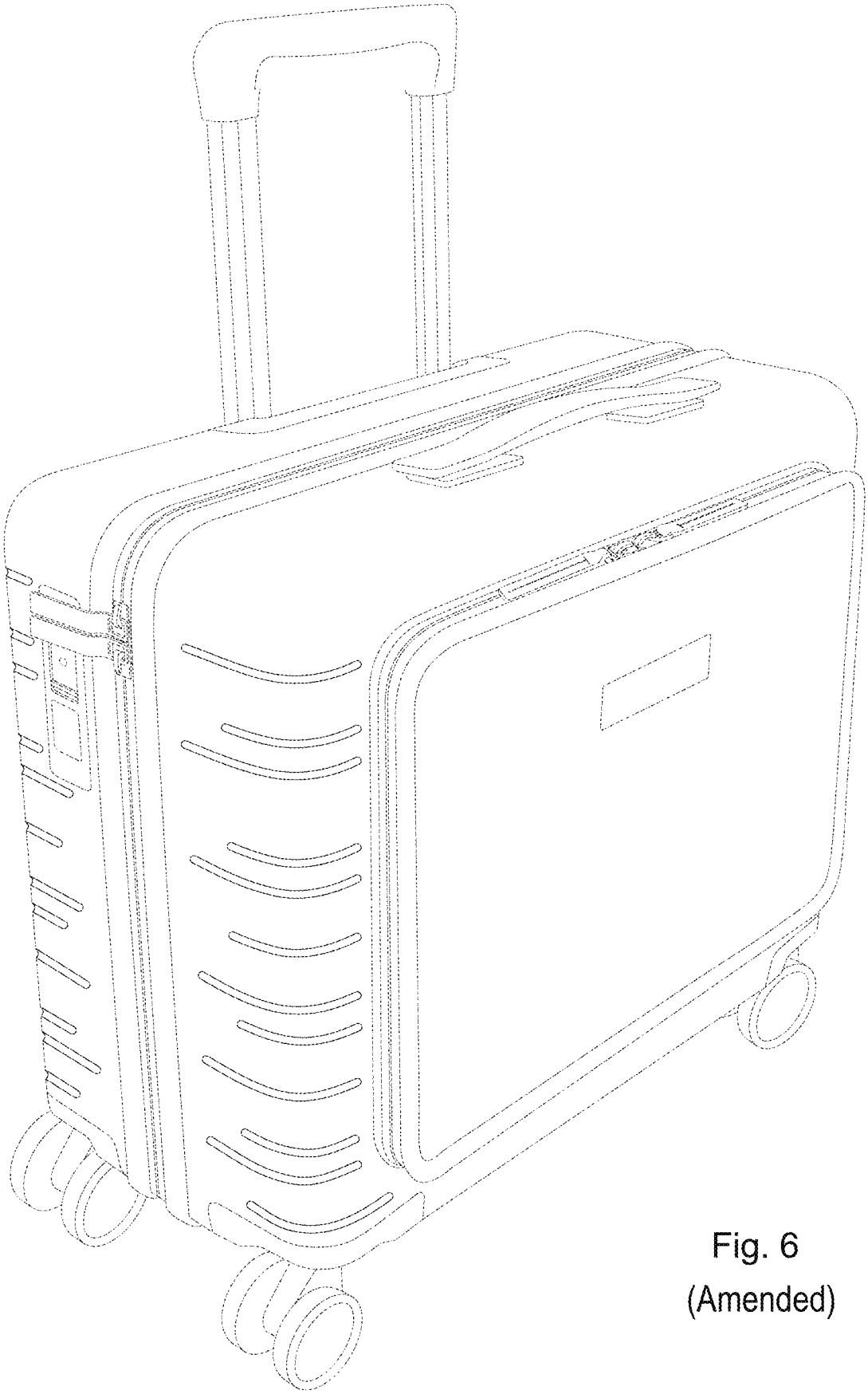
Fig. 6
(Amended)

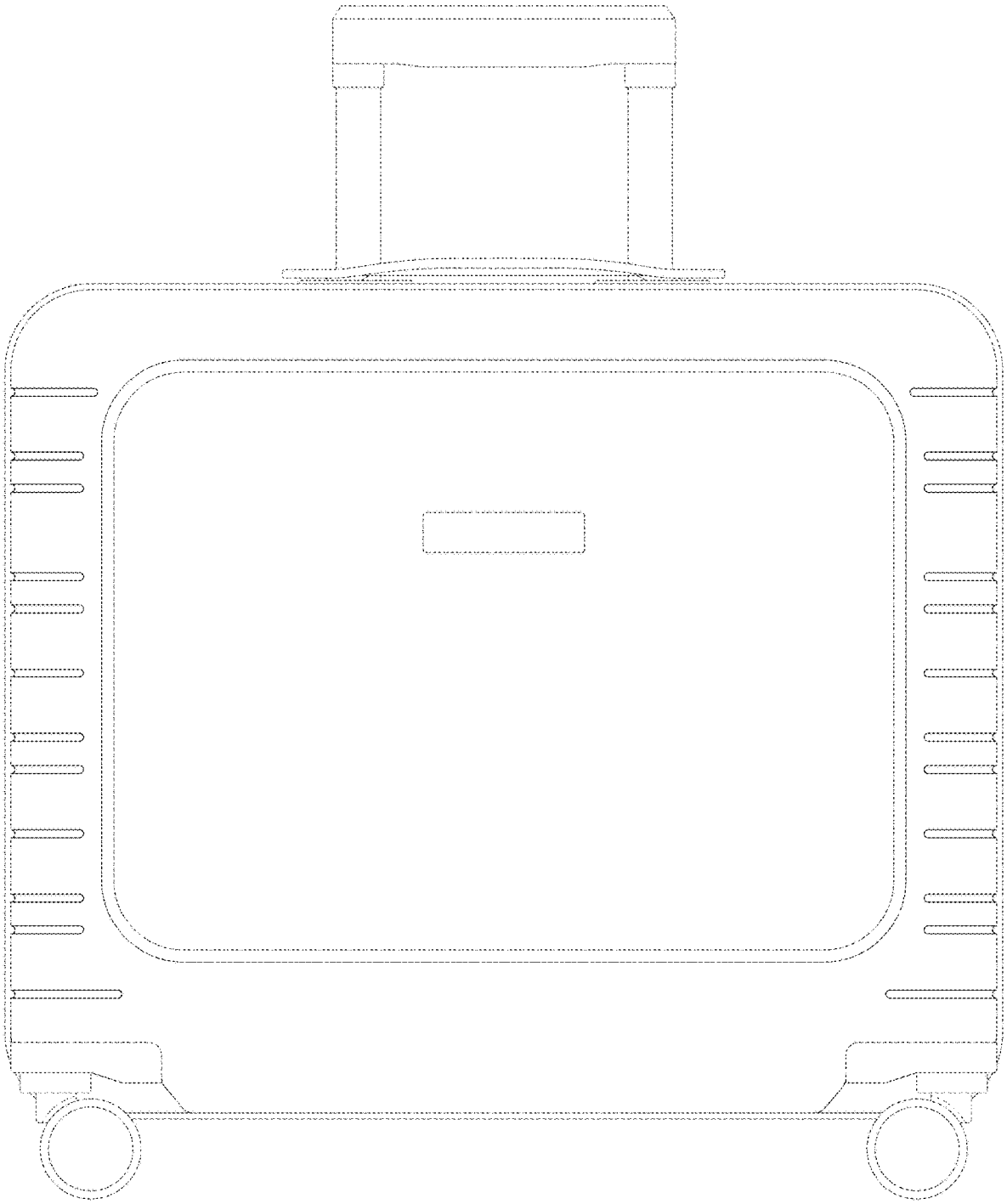
Fig. 7
(Amended)

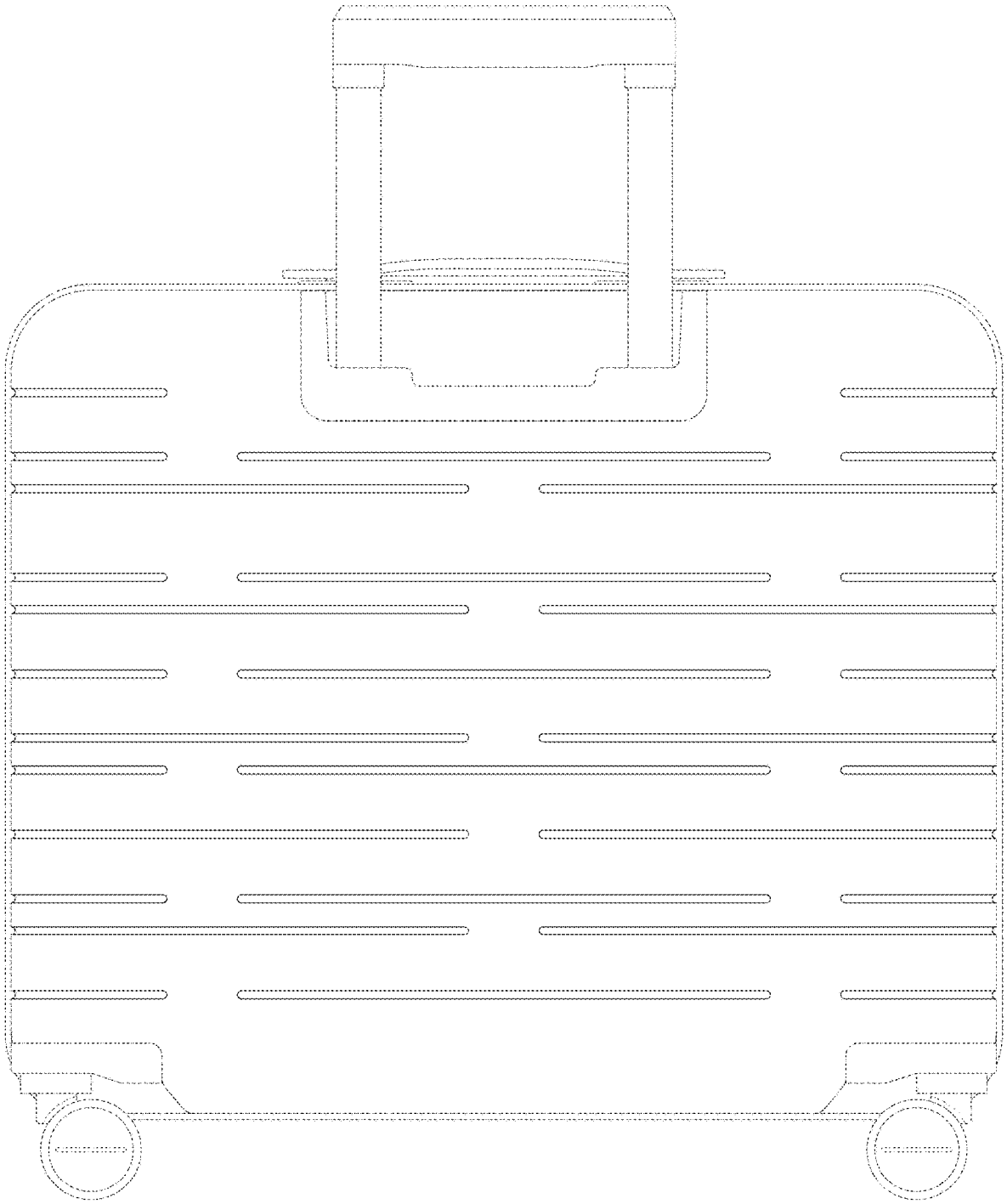
Fig. 8
(Amended)

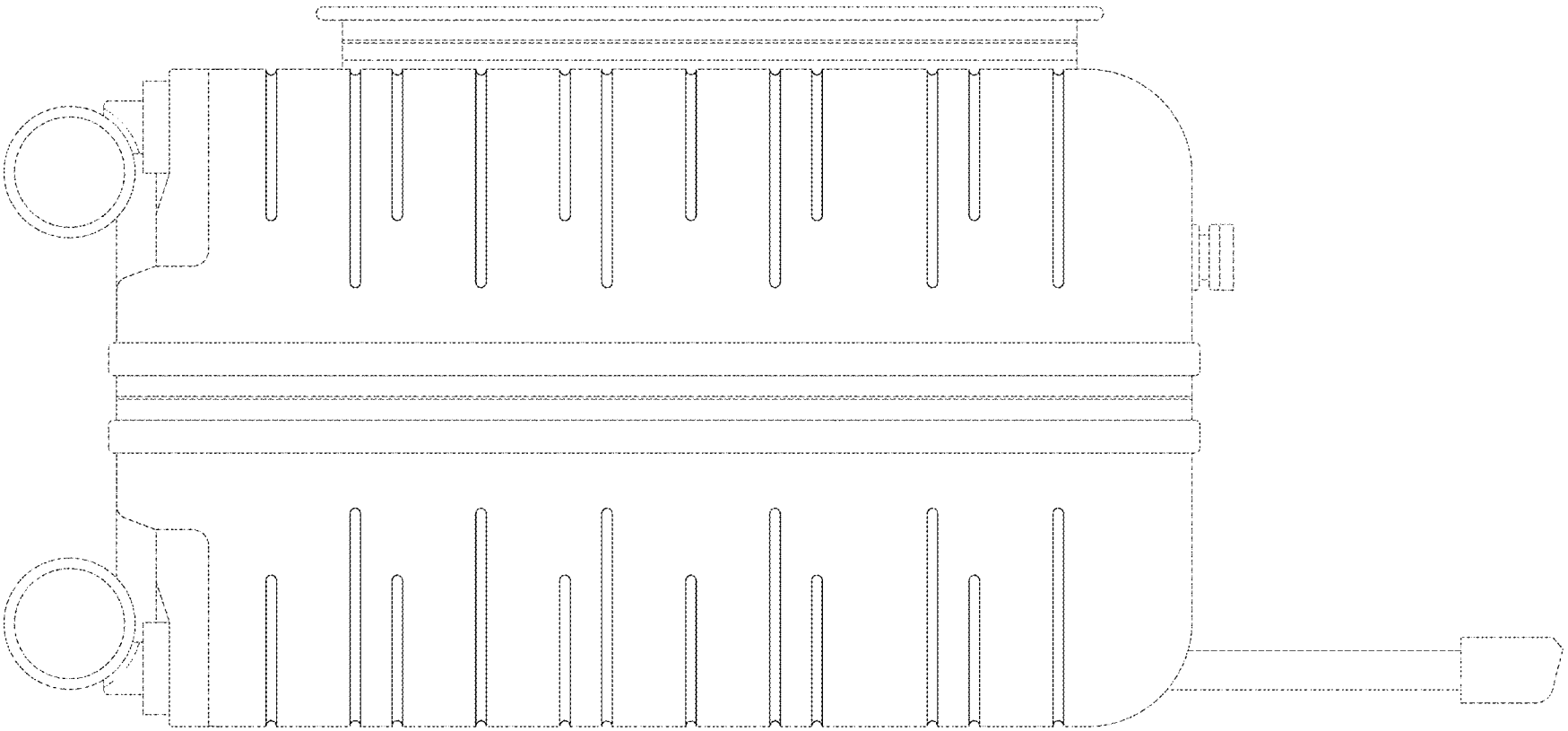
Fig. 9
(Amended)

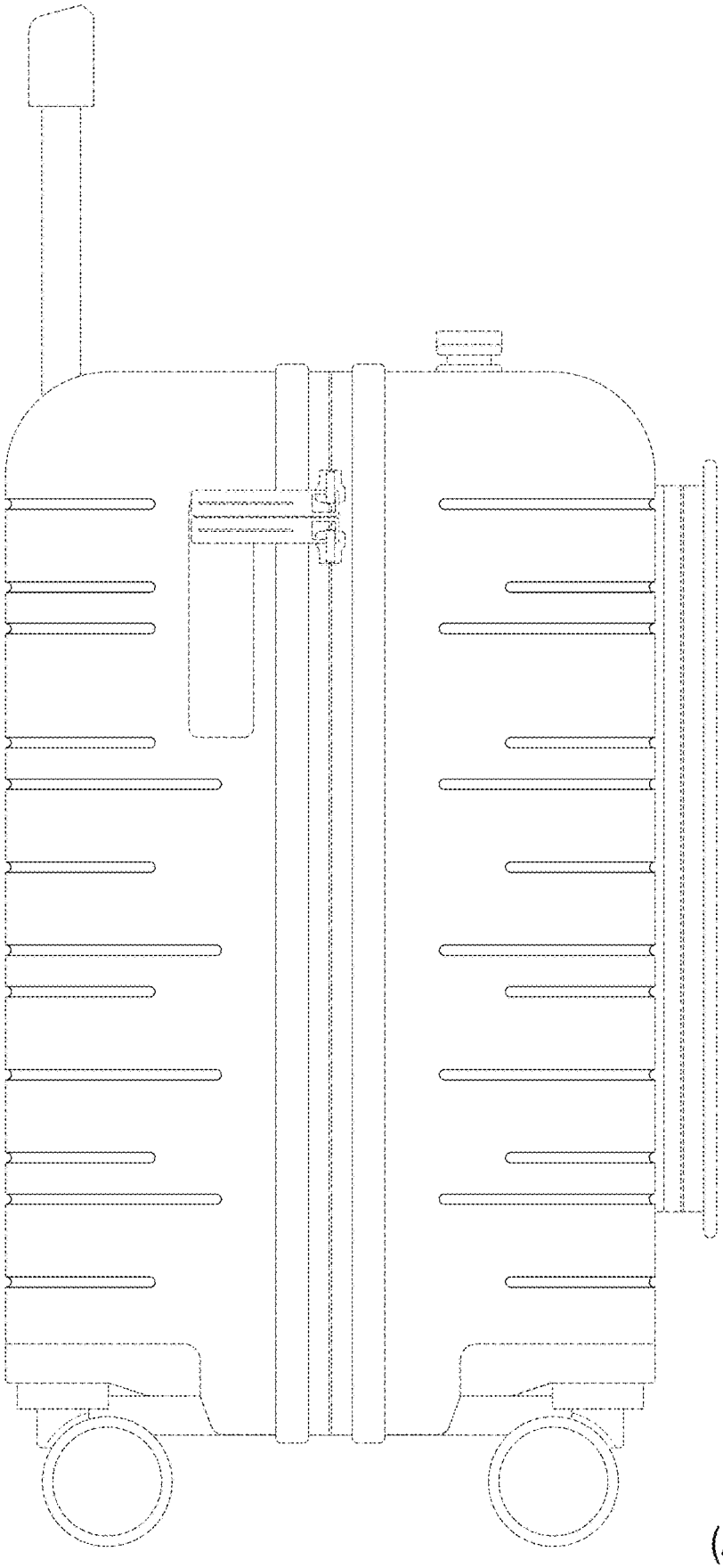
Fig. 10
(Amended)